US012432303B2

(12) United States Patent
Shimohira et al.

(10) Patent No.: US 12,432,303 B2
(45) Date of Patent: Sep. 30, 2025

(54) WEB TELEPHONE SYSTEM, WEB TELEPHONE SERVER APPARATUS, AND COMPUTER PROGRAM PRODUCT STORING A WEB TELEPHONE PROGRAM

(71) Applicant: THISIS Inc., Tokyo (JP)

(72) Inventors: Seiichiro Shimohira, Tokyo (JP); Yusuke Matsukawa, Tokyo (JP)

(73) Assignee: THISIS Inc., Tokyo (JP)

( * ) Notice: Subject to any disclaimer, the term of this patent is extended or adjusted under 35 U.S.C. 154(b) by 0 days.

(21) Appl. No.: 18/034,247

(22) PCT Filed: Oct. 31, 2022

(86) PCT No.: PCT/JP2022/040814
§ 371 (c)(1),
(2) Date: Apr. 27, 2023

(87) PCT Pub. No.: WO2024/095347
PCT Pub. Date: May 10, 2024

(65) Prior Publication Data
US 2024/0357037 A1    Oct. 24, 2024

(51) Int. Cl.
*H04M 3/54* (2006.01)
*G06K 7/14* (2006.01)
*H04M 7/00* (2006.01)

(52) U.S. Cl.
CPC .......... *H04M 3/543* (2013.01); *G06K 7/1417* (2013.01); *H04M 7/0063* (2013.01)

(58) Field of Classification Search
CPC ... H04M 3/543; H04M 7/0063; G06K 7/1417
See application file for complete search history.

(56) References Cited

FOREIGN PATENT DOCUMENTS

| JP | 2002-524976 A | 8/2002 |
|---|---|---|
| WO | 00/14934 A1 | 3/2000 |

OTHER PUBLICATIONS

International Search Report with Written Opinion of the International Searching Authority issued by the Japan Patent Office for corresponding International Patent Application No. PCT/JP2022/040814, mailed on Jan. 17, 2023, with partial English translation.

*Primary Examiner* — Elton Williams
(74) *Attorney, Agent, or Firm* — Myers Wolin, LLC (57) ABSTRACT

In a state where the first P2P connecting the caller and the callee and the second P2P path connecting the callee and the take-over person are established, when the callee receives a switching operation, AC information including identification information of the caller and the take-over person is transmitted to the WEB server. The WEB server transmits A-C meeting information indicating a meeting area for the calling terminal and the takeover terminal to wait in the signaling server to the called terminal which is the transmission source of the AC information. The destination node transmits the A-C meeting information to the two nodes using the first P2P path and the second P2P path.

9 Claims, 7 Drawing Sheets

WEB TELEPHONE SYSTEM, WEB TELEPHONE SERVER APPARATUS, AND COMPUTER PROGRAM PRODUCT STORING A WEB TELEPHONE PROGRAM

CROSS-REFERENCE TO RELATED APPLICATION

This application is a National Stage application under 35 U.S.C. 371 of International Application No. PCT/JP2022/040814, filed on Oct. 31, 2022 and designated the U.S. The contents of which are herein incorporated by reference.

TECHNICAL FIELD

The present disclosure relates to a WEB telephone system, a WEB telephone server device, and a WEB telephone program, and more particularly to a WEB telephone system, a WEB telephone server device, and a WEB telephone program suitable for providing a user with a telephone function via the WEB.

BACKGROUND ART

Patent Document 1 discloses a system for enabling data network telephony (DNT) communication via WEB pages. In IP telephony via the WEB, it is usual to request installation of a compatible application for IP telephony (hereinafter referred to as "IP telephony application") in a device on a calling side and a device on a receiving side.

There are various types of IP telephone applications, and in general, compatibility is not recognized between different types of IP telephone applications. Therefore, in order to support various IP phones, it is necessary to install various IP phone applications in a device used for IP phones.

Patent Document 1 proposes a system for solving such a problem. Specifically, according to this system, a caller of an IP telephone accesses a link of a specific WEB page to download a necessary IP telephone application, and the IP telephone application is uninstalled after several calls stored in advance are finished.

RELATED ART

Patent Document

[Patent Document 1]
JP 2002/524976 A

SUMMARY

Problem to be Solved

According to the way described in Patent Document 1, it is not necessary to always install the IP telephone application in the user's device. Therefore, the user can enjoy a merit that the storage capacity of the device is not wastefully consumed.

However, in business situations, for example, there is a need to relay a call from a callee to a take-over person. Against such a demand, the technology described in Patent Document 1 does not provide any disclosure regarding the takeover of the IP telephone.

The present disclosure has been made to solve the above-described problem, and a first object thereof is to provide a WEB telephone system in which a called terminal receiving an IP telephone call from a calling terminal can hand over the IP telephone call to a take-over terminal.

A second object of the present disclosure is to provide a WEB telephone server device for realizing a function of allowing a called terminal receiving an IP telephone call from a calling terminal to hand over the call of the IP telephone call to a takeover terminal.

A third object of the present disclosure is to provide a WEB telephone program for realizing a function of handing over an IP telephone call from a calling terminal to a takeover terminal in a called terminal.

Means for Solving the Problem

According to a first aspect of the present disclosure, there is provided a WEB telephone system comprising:
 a calling terminal (A) that makes an IP telephone call;
 a called terminal (B) that receives the IP telephone call from the calling terminal (A);
 a takeover terminal (C) that takes over a call from the calling terminal (A) from the called terminal (B);
 a WEB server and a signaling server capable of communicating with the calling terminal (A), the called terminal (B), and the take-over terminal (C) via a network; and
 a notification server configured to transmit a call signal to a terminal designated by a call request from the WEB server, wherein
 said WEB telephone system is configured to execute:
 establishing a first P2P path between the calling terminal (A) and the called terminal (B) in response to a call from the calling terminal (A) to the called terminal (B); and
 establishing a second P2P path between the called terminal (B) and the take-over terminal (C) while maintaining the first P2P path in response to a calling operation performed on the called terminal (B) to the take-over terminal (C) during the first P2P path is established,
 said called terminal (B) is configured to execute:
 accepting a switching operation for transferring the IP telephone call from the calling terminal (A) to the take-over terminal (C) in a state in which the first P2P path and the second P2P path are established; and
 transmitting AC information including identification information of each of the calling terminal (A) and the take-over terminal (C) to the WEB server in response to the switching operation,
 said WEB server is configured to execute transmitting A-C meeting information to the called terminal B when receiving the AC information from the called terminal (B), said AC information being information of other two terminals different from the called terminal (B), and said A-C meeting information indicating a meeting area for the other two terminals to meet in the signaling server,
 said called terminal (B) is configured to further execute:
 disconnecting the first P2P path after transmitting the A-C meeting information to the calling terminal (A) via the first P2P path; and
 disconnecting the second P2P path after transmitting the A-C meeting information to the take-over terminal (C) via the second P2P path,
 said calling terminal (A) and said take-over terminal (C) are configured, respectively, to execute:
 exchanging information of an SDP required for establishing a P2P path between both via the meeting area indicated by the A-C meeting information; and transmitting and receiving voice signals to and from each other via a third P2P path established based on the SDP.

A second aspect is a WEB-phone server device capable of communicating with a calling terminal(A), a called terminal (B), and a take-over terminal(C) via a network, wherein said WEB telephone server is configured to execute, when AC information, which is information of other two terminals different from the called terminal B, is received from the called terminal B, transmitting A-C meeting information, which indicates a meeting area for the other two terminals to meet in the signaling server, to the called terminal B, which is a transmission source of the AC information, said AC information is information including identification information of each of the calling terminal(A) and the take-over terminal(C) corresponding to the other two terminals.

A third aspect is a WEB phone program for causing a smartphone to function as a called terminal(B) that hands over an IP telephone call from a calling terminal(A) to a take-over terminal(C), the WEB telephone program including a computer readable program causing the smartphone to execute:

establishing a first P2P path between the calling terminal (A) and the called terminal(B) in response to a call from the calling terminal(A) to the called terminal(B);

establishing a second P2P path between the called terminal(B) and the take-over terminal(C) while maintaining the first P2P path in response to a calling operation performed on the called terminal(B) to the take-over terminal(C) during the first P2P path is established;

accepting a switching operation for transferring the IP telephone call from the calling terminal(A) to the take-over terminal(C) in a state in which the first P2P path and the second P2P path are established;

transmitting AC information including identification information of each of the calling terminal(A) and the take-over terminal(C) to a WEB server in response to the switching operation;

receiving A-C meeting information which the WEB server that has received the AC information returns to notify a meeting area where the calling terminal(A) and the take-over terminal(C) are to be met in the signaling server;

disconnecting the first P2P path after transmitting the A-C meeting information to the calling terminal(A) via the first P2P path; and disconnecting the second P2P path after transmitting the A-C meeting information to the take-over terminal(C) via the second P2P path.

ADVANTAGE

According to the first to third aspects, it is possible to realize a function in which a called terminal receiving an IP telephone call from a calling terminal smoothly hands over the call of the IP telephone call to a takeover terminal in a short time.

DETAILED DESCRIPTION

Embodiment 1

Function of First Embodiment

Figure 1:
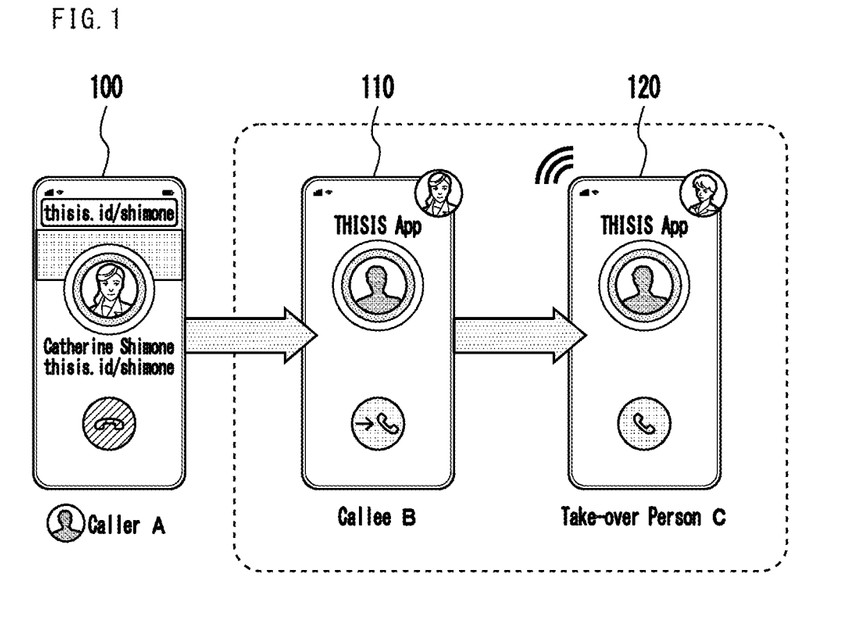
FIG. 1 is a diagram for explaining a characteristic function of a WEB telephone system according to a first embodiment of the present disclosure.

FIG. 1 is a diagram for explaining functions of a WEB telephone system according to a first embodiment of the present disclosure. The WEB telephone system according to the present exemplary embodiment is a system in which a smartphone 100 is connected to another smartphone 110 or 120. The smartphone 100 is a device owned by a caller(A) of an IP telephone call.

The example shown in FIG. 1 further includes two smartphones 110 and 120. The smartphone 110 is a device owned by a callee(B) of the IP telephone call. The smartphone 120 is a device owned by a take-over person(C) who takes over the call from the caller(A) via the transfer by the callee(B). It is assumed that the caller(A) is a customer of the same company or the same team to which the callee(B) and the take-over person(C) belong.

An IP telephone application (illustrated as "THIS IS App" in the drawing) is installed in the smartphone 110 of the callee(B) and the smartphone 120 of the take-over person (C). On the other hand, a WEB browser and a two-dimensional barcode scanner, which are general applications, are installed in the smartphone 100 of the caller(A), but an IP telephone application dedicated to the present embodiment is not installed.

In the example shown in FIG. 1, an IP telephone call is made from the caller(A) to a company to which the callee(B) and the take-over person(C) belong. A URL(Team) unique to the company is set in advance in the smartphone 110 of the callee(B) and the smartphone 120 of the take-over person (C). The WEB telephone system according to the present embodiment is configured such that when the caller(A) accesses the URL(Team) on the WEB browser, a call is directed from the smartphone 100 to the smartphone 110 and the smartphone 120. When the URL(Team) is accessed from the outside, the terminal-specific identifier information in which the terminal-specific identifiers of the smartphones associated with the URL(Team) are stored is read, and calls are made to all the smartphones matching the stored terminal-specific identifiers. Both the smartphone 110 and the smartphone 120 can accept the incoming call. In this case, if the callee(B) performs an operation of accepting the incoming call first, connection information is exchanged between the smartphone 100 and the smartphone 110 in response to the operation, a call between A and B is started, and the call to the smartphone 120 is canceled.

In the example shown in FIG. 1, since the person with whom the caller(A) wishes to talk is not the callee(B) but the take-over person(C), the callee(B) performs a takeover operation to hand over the call from the callee(B) to the take-over person(C). A unique URL(C) is set in advance in the smartphone 120 of the take-over person(C). The WEB telephone system according to the present embodiment is configured such that when the callee(B) accesses the unique URL(C) of the take-over person during the call with the caller(A), a call is originated from the smartphone 110 to the smartphone 120 while maintaining the call. In addition, the WEB telephone system of the present embodiment is configured such that when the take-over person(C) accepts the take-over, connection information is exchanged between the smartphone 100 and the smartphone 120, and a call between the caller(A) and the take-over person(C) becomes possible. The phone 110 of the callee(B) enters a call state with both the smartphone 100 of the caller(A) and the smartphone 120 of the take-over person(C) at the same time, and the callee (B) can disconnect his/her call after confirming that the call with the take-over person(C) has been started.

Figure 2:
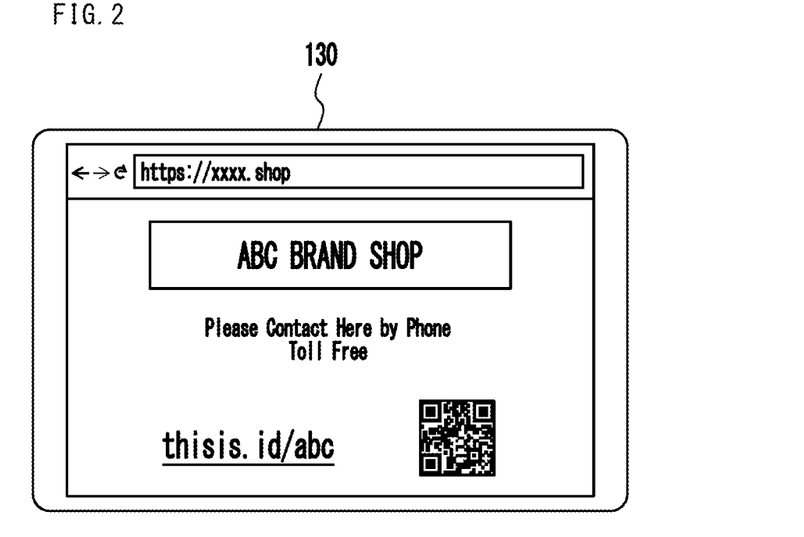
FIG. 2 illustrates an example of a two dimensional barcode being referred to by a caller in the WEB telephone system according to the first embodiment of the present disclosure.

FIG. 2 shows an example of a two-dimensional barcode referred to by the caller(A) in the present embodiment. More specifically, FIG. 2 illustrates a card 130 that is a business card on which a QR code (registered trademark) is printed as a two-dimensional barcode. URL(Team) information is embedded in the two-dimensional barcode. If the caller(A) has the card 130, the caller(A) can simultaneously make calls to all registered members of the team to which the callee(B) and the take-over person(C) belong only by reading the two-dimensional barcode with the smartphone 100. As a matter of course, the QR code written on the business card may be that of the team, the URL(B) unique to the callee(B), or both. The URL(Team) corresponds to a representative number in terms of the telephone number of the Team. The transfer destination of the incoming call may be a URL(D) not associated with the URL(Team) but associated with another smartphone (not illustrated), or may be a URL(Team 2) of another team.

As described above, according to the WEB telephone system of the present embodiment, the smartphone 100 of the caller(A) only accesses a specific URL from a browser, and is not required to install a special IP phone application in the smartphone 100. If the caller(A) has the card 130 in which the URL(B) of the callee(B) is embedded, the caller (A) can easily make a call to the individual callee(B) or to the entire team to which the callee(B) belongs only by reading the two-dimensional barcode. For this reason, if a business card on which a two-dimensional barcode in which the URL of myself is embedded is printed is distributed to the caller(A) who is the customer, it is possible to greatly save time and effort when the customer makes an IP telephone call to me. As a matter of course, since this URL is a normal URL, the URL is stored in the smartphone 100 of the caller(A) as an acceleration history or can be registered as "favorites". Thus, the caller(A) can easily make a call again. Further, since the URL is a normal URL, the URL may be accessed not from the QR code but from a manual input of an address, character recognition, a link from a company WEB site, or the like.

In addition, according to the WEB telephone system of the present embodiment, it is easy to transfer an incoming call to another person between the users who have the smartphones 110 and 120 in which the "THIS IS App" is installed. In business situations, there is a frequent need to relay incoming calls to interested parties. According to the WEB telephone system of the present embodiment, such a request can also be met. From the above points, the WEB telephone system of the present embodiment is highly useful as a communication tool used by an organization such as a company for business. In addition, according to the WEB telephone system of the present embodiment, since what is notified to the customer is only the URL associated with his/her own smartphone, B or C who is, for example, an employee of a company can associates the URL with a personally owning smartphone. Even if employees B and C of the company register their private smartphones to the URL(Team), URL(B), or URL(C), the information disclosed to the customer is only the corresponding URL, and thus a unique address such as a personal telephone number is not disclosed. It is not necessary for the employee to have both a private smartphone and a corporate smartphone. From the viewpoint of the company, even if the employee is retired or moved, the URL(Team) described on the business card distributed to the customer can be continuously utilized only by replacing the smartphone associated with the URL(Team) with that of the succeeded employee. Therefore, the network with the important customer is not lost due to the retirement or movement of the employee.

Configuration of First Embodiment

Figure 3:
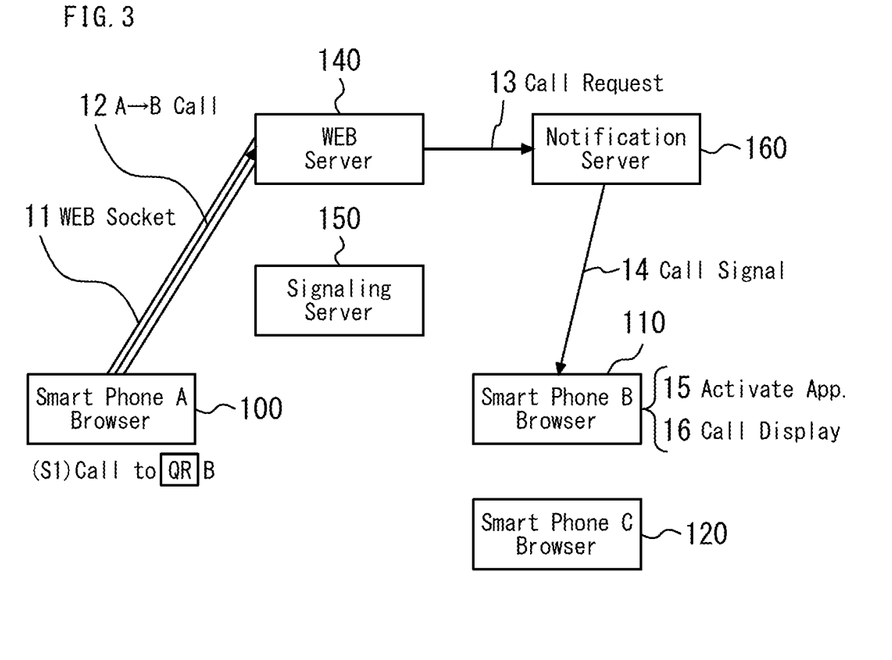
FIG. 3 is a diagram for explaining a configuration of the WEB telephone system according to the first embodiment of the present disclosure and a flow of processing from a call is made to the call arrives at its destination.

FIG. 3 illustrates an overall configuration of the WEB telephone system according to the first embodiment of the present disclosure. As shown in FIG. 3, the WEB telephone system according to the present embodiment includes a WEB server 140, a signaling server 150, and a notification server 160 in addition to the three smartphones 100, 110, and 120 described above.

Each of the smartphones 100, 110, and 120 includes a processor such as a CPU, a memory device including a ROM, a RAM, and the like, and an input/output interface such as a display. Similarly, each of the WEB server 140, the signaling server 150, and the notification server 160 includes elements such as a processor, a memory device, and an input/output interface. In any case, a desired function is realized by a processor executing necessary processing in accordance with a program stored in a memory device.

Processing Flow in First Embodiment

Referring to FIGS. 3 to 14, a flow of processing executed in the WEB telephone system of the present embodiment will be described below. In the following description, operations performed by users of the smartphones 100, 110, and 120 are denoted by reference numerals such as (S1) and (S2), and phenomena, signals, and the like caused by the operations are denoted by reference numerals having only numerical values without S such as (11) and (12).
[Start of Call Using IP Phone]

FIG. 3 shows, in addition to the above-described configuration, a flow of processing from a call is made to the call arrives at its destination. In the example shown in FIG. 3, first, the caller(A) performs a calling operation toward the URL(Team) described on the name card distributed by the callee(B) (S1). The calling operation is performed by the caller(A) scanning the QR code (trademark) of the card 130 illustrated in FIG. 2 with the smartphone 100, for example.

When the above calling operation is performed, the smartphone 100 first opens a WEB socket for the WEB server 140 (11).

Subsequently, the smartphone 100 transmits an "A to entire team call" including information of the URL(Team) to the WEB server 140 (12).

In the WEB server 140, user information of the IP telephone application is registered as IP telephone registration information. In the present embodiment, as the IP telephone registration information, for example, a terminal-specific identifier of the smartphone 110 (the identifier may be, but is not limited to, an IP address or a telephone number), information of a URL(B) used in the IP telephone application "THIS IS App", and the like are registered in a list format for the callee(B).

Upon receiving the "A to entire team call", the WEB server 140 recognizes that the call is an IP telephone call to both smartphones 110 and 120 associated with the URL (Team) based on the URL(Team) included in the call. Then, the terminal-specifying identifiers of the smartphones 110 and 120 are read out, and a call request for "THIS IS App" corresponding to their telephone numbers is transmitted to the notification server 160 (13).

The notification server 160 is a server operated by a communication carrier (a data communication management company or the like in a case where the terminal-specifying identifier is not a telephone number but an IP address) managing the smartphones 110 and 120. The notification server 160 has a function of issuing a call signal for causing a push notification related to an application to a device having a terminal-specifying identifier when receiving a call request specifying the terminal-specifying identifier and the application. Therefore, upon receiving the call request from the WEB server 140, the notification server 160 transmits a call signal related to "THIS IS App" to all the smartphones associated with the URL(Team), in this case, the two smartphones 110 and 120 (14).

Upon receiving the call signal from the notification server 160, the smartphones 110 and 120 activate the IP telephone application "THIS IS App" (15). Also, an incoming call display for notifying the incoming call to the incoming call callee(B) and the take-over person(C) is generated (16).

Figure 4:
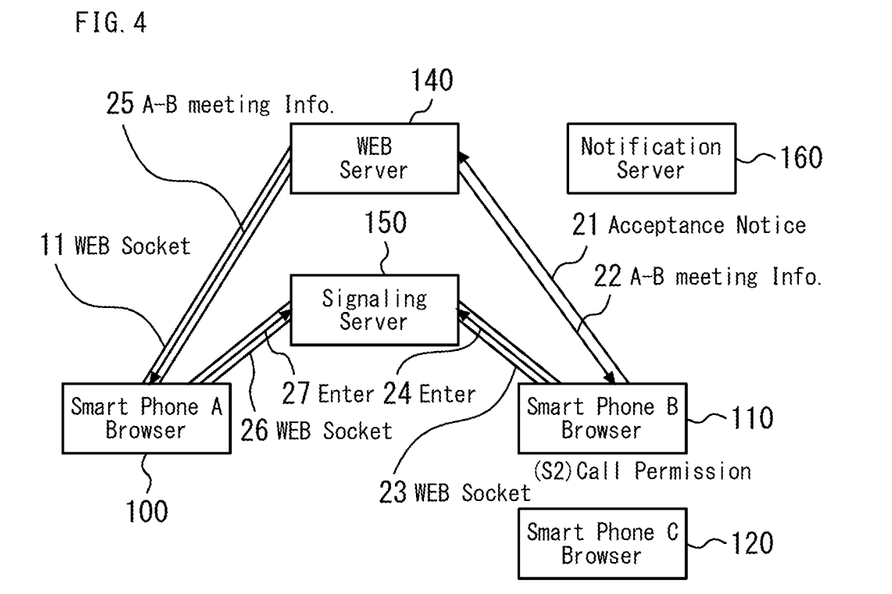
FIG. 4 is a diagram for explaining a flow of processing from when a callee permits a call to when waiting between a caller(A)nd the callee is completed in the WEB telephone system according to the first embodiment of the present disclosure.

FIG. 4 is a diagram for explaining a flow of processing after the incoming call display occurs in the smartphone 110. In the example shown in FIG. 4, upon confirming the call display, the callee(B) executes an operation of the call permission (S2).

When the callee(B) accepts the call, the smartphone 110 transmits an acceptance notification to the WEB server 140 (21). In response to this, the WEB server 140 performs a process of stopping the call to all other smart phones registered in the URL(Team) other than the smart phone 110 that has transmitted the acceptance notification, in this case, the smart phone 120.

Upon receiving the acceptance notification, the WEB server 140 returns A-B meeting information to the smartphone 110 (22). The A-B meeting information is information necessary for the smartphone 100 of the caller(A) and the smartphone 110 of the callee(B) to exchange information necessary for establishing communication in the signaling server 150.

Upon receiving the A-B meeting information, the smartphone 110 first opens a WEB socket to the signaling server 150 (23). Next, the user "enters" the area indicated by the A-B meeting information (24). The "enters" means waiting in a state in which information can be exchanged in the area. In the following description, "enters" or "entering" is used in this sense.

Upon receiving the acceptance notification from the smartphone 110, the WEB server 140 transmits the A-B meeting information also to the smartphone 100 of the caller(A) (25). This transmission is performed by using the established WEB socket 11 (see FIG. 3).

Similarly to the smartphone 110, the smartphone 100 that has received the A-B meeting information opens a WEB socket to the signaling server 150 (26) and enters the meeting area (27).

Figure 5:
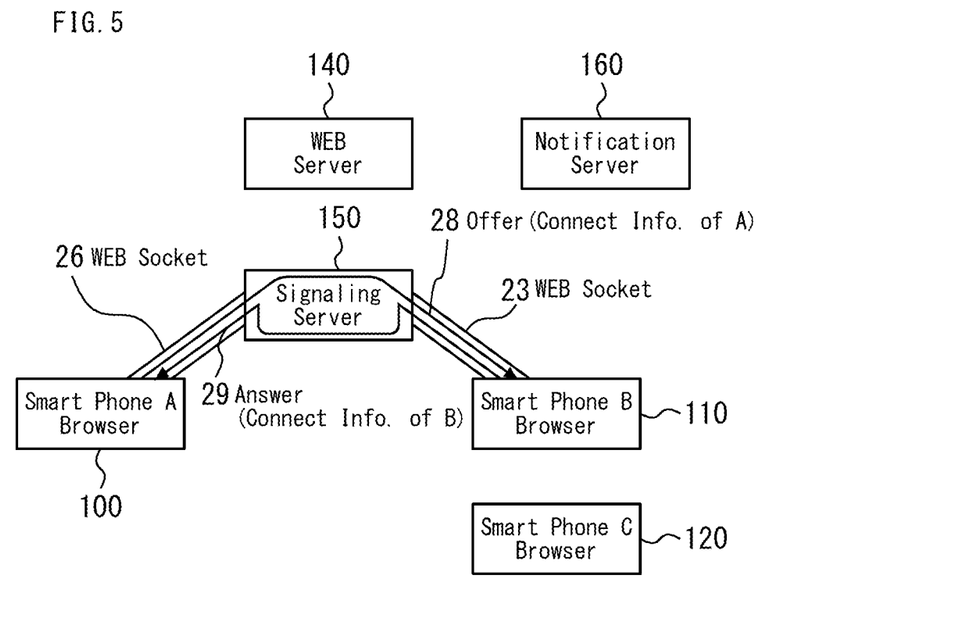
FIG. 5 is a diagram showing a state in which the caller (A)nd the callee exchange connection information with each other in the WEB telephone system according to the first embodiment of the present disclosure.

FIG. 5 is a diagram for explaining a flow of processing after both the smartphone 100 of the caller(A) and the smartphone 110 of the callee(B) enter the meeting area of the signaling server 150. When a plurality of smartphones having the same meeting information enter the area, the signaling server 150 provides a notification to the smartphone that enters the area later that there is a smartphone that has already entered the area. Then, the smartphone that has received the notification issues an offer for information exchange to the smartphone that has entered the area first using the function of the browser.

In the example illustrated in FIG. 5, the smartphone 110 of the callee(B) enters the area first, and the smartphone 100 of the caller A enters the area later. In this case, the offer is transmitted from the smartphone 100 of the caller(A) to the smartphone 110 of the callee(B) (28). The offer includes a session description protocol (SDP) necessary for establishing communication with the smartphone 100, such as an IP address, a port number, and a communication band of the smartphone 100.

Upon receiving the offer, the smartphone 110 of the callee(B) returns an answer including an SDP necessary for communication with itself (29). As a result of the above-described processing, the two smartphones 100 and 110 reached a state in which they have acquired information necessary for communication with each other.

Figure 6:
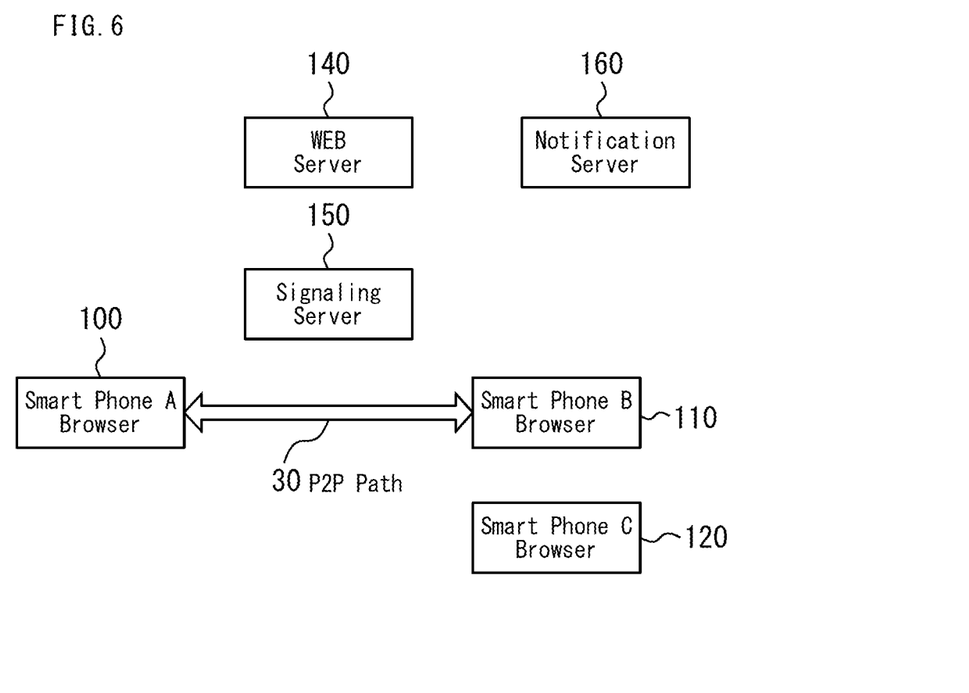
FIG. 6 is a diagram showing a state in which a P2P path is opened between the caller(A)nd the callee in the WEB telephone system according to the first embodiment of the present disclosure.

FIG. 6 shows a state after the above-described information exchange is completed. As shown in FIG. 6, the smartphones 100 and 110 establish a P2P path that enables communication therebetween based on each other's SDP (30). Thereafter, both parties can start voice communication via the P2P path. Accordingly, the WEB server 140 returns to a state of waiting for another incoming call.

[Takeover of IP Telephone]

Figure 7:
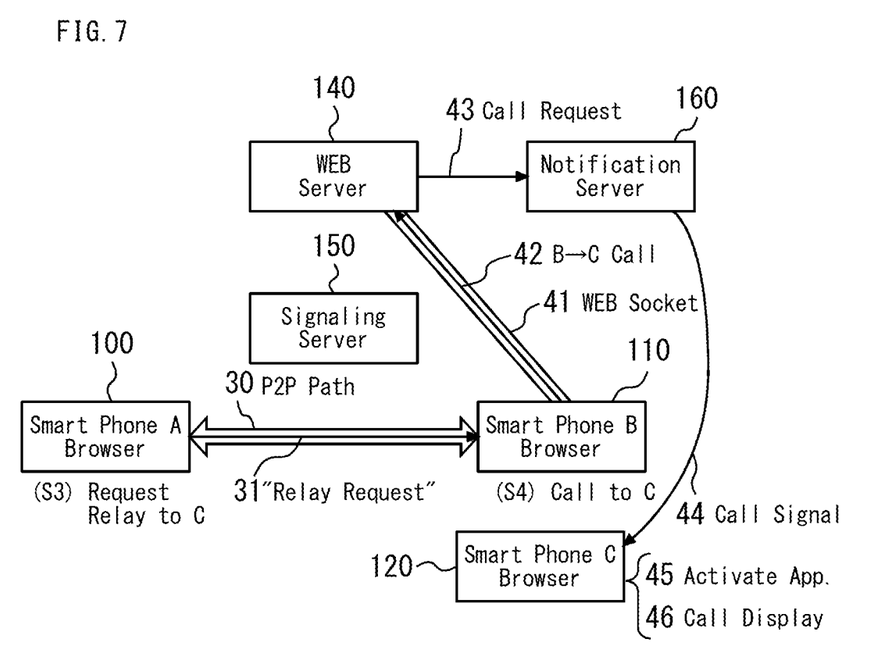
FIG. 7 is a diagram for explaining a flow of processing after the caller requests the callee to relay the call in a state where the P2P path is opened between the caller(A)nd the callee until the transferred call is received by a take-over person in the WEB telephone system according to the first embodiment of the present disclosure.

FIG. 7 is a diagram for explaining a flow of processing in a case where the caller(A) requests the callee(B) to relay a call to the person(C) (S3). Since the caller(A) and the callee(B) are communicating with each other by voice, the relay request can be made by voice like "Please relay to the person (C)".

The callee(B) who has received the relay request from the caller(A) performs a calling operation to the person (C) on the smartphone 110, that is, accesses the unique URL(C) associated with only the smartphone 120 of the person (C) (S4), in order to confirm whether or not the person (C) accepts the takeover of the telephone call. Thereafter, the above-described processing is repeated between the smartphone 110 of the callee(B) and the smartphone 120 of the take-over person(C), so that a P2P path is established therebetween.

Specifically, first, a WEB socket for the WEB server 140 is opened by the smartphone 110 of the callee(B) (41).

The callee(B) and the take-over person(C) are both users of the IP telephone application, and their URLs (B) and (C) have been exchanged with each other in advance. Therefore, the URL(C) of the smartphone 120 is registered in the smartphone 110. When the WEB socket is opened, the smartphone 110 transmits a B-to-C call including information of the URL(C) to the WEB server 140 (42).

Based on the URL(C) included in the B-to-C call, the WEB server 140 recognizes that the call is directed to the smartphone 120. Then, a request for calling the smartphone 120 is transmitted to the notification server 160 (43).

Upon receiving the call signal from the notification server 160 (44), the smartphone 120 activates the IP phone application (45) and generates an incoming call display (46).

Figure 8:
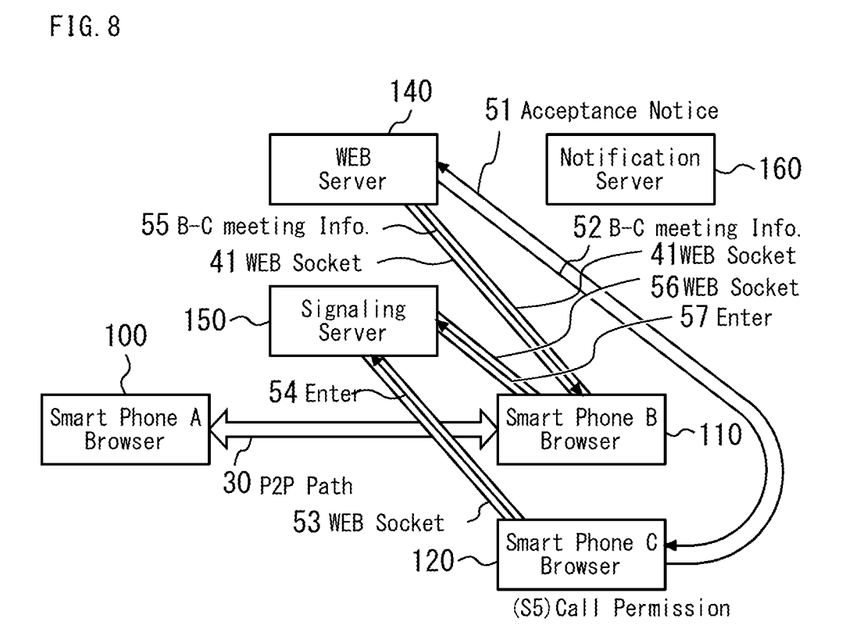
FIG. 8 is a diagram for explaining a flow of processing from when the take-over person accepts a call to when waiting between the callee and the take-over person is completed in the WEB telephone system according to the first embodiment of the present disclosure.

FIG. 8 illustrates a flow of processing after the incoming call display is generated in the smartphone 120. In the example shown in FIG. 8, responding to the incoming call display, the take-over person(C) executes an operation of the call permission (S5).

When the take-over person(C) accepts the call, the smartphone 120 transmits an acceptance notification to the WEB server 140 (51).

Upon receiving the acceptance notification, the WEB server 140 returns B-C meeting information to the smartphone 120 (52).

Upon receiving the B-C meeting information, the smartphone 120 opens a WEB socket to the signaling server 150 (53) and enters the meeting area (54).

Upon receiving the acceptance notification from the take-over person(C), the WEB server 140 transmits the B-C meeting information also to the smartphone 110 of the callee(B) (55). This transmission is performed by using the already established WEB socket 41 (see FIG. 7).

Similarly to the smartphone 120, the smartphone 110 that has received the B-C meeting information opens a WEB socket to the signaling server 150 (56) and enters the meeting area (57).

Figure 9:
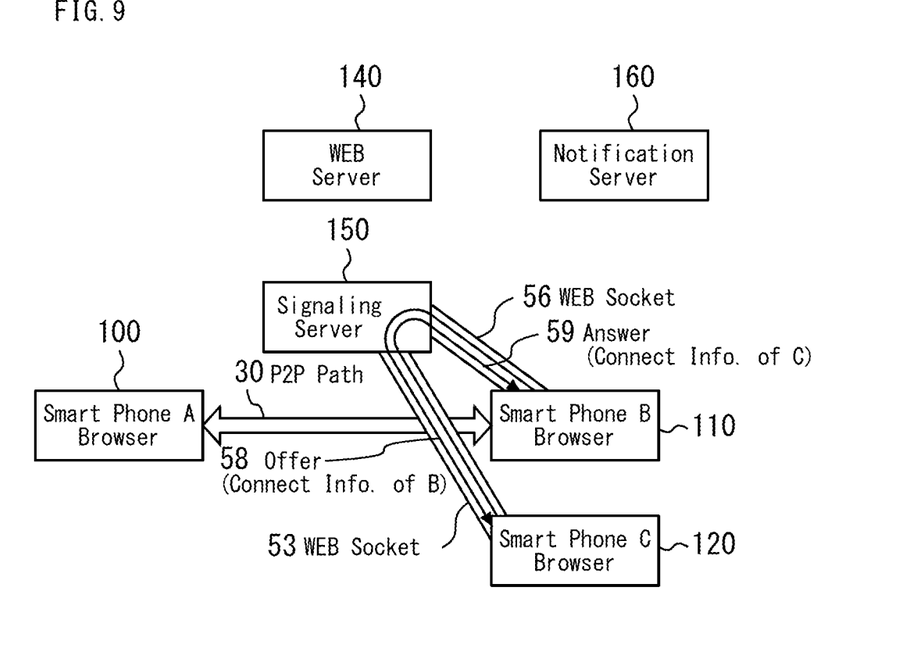
FIG. 9 is a diagram showing a state in which the callee and the take-over person exchange connection information with each other in the WEB telephone system according to the first embodiment of the present disclosure.

FIG. 9 illustrates a state in which the smartphone 110 of the callee(B) and the smartphone 120 of the take-over person(C) exchange information with each other in the meeting area. As shown in FIG. 9, in the present example, an offer including an SDP necessary for communication with the callee B is transmitted from the smartphone 110 of the callee B to the smartphone 120 of the take-over person(C) (58).

The smartphone 120 of the take-over person(C) receives the offer and returns an answer including an SDP necessary for communication with itself to the smartphone 120 (59). Through the above-described processing, the smartphones 110 and 120 can obtain information necessary for communication with each other.

Figure 10:
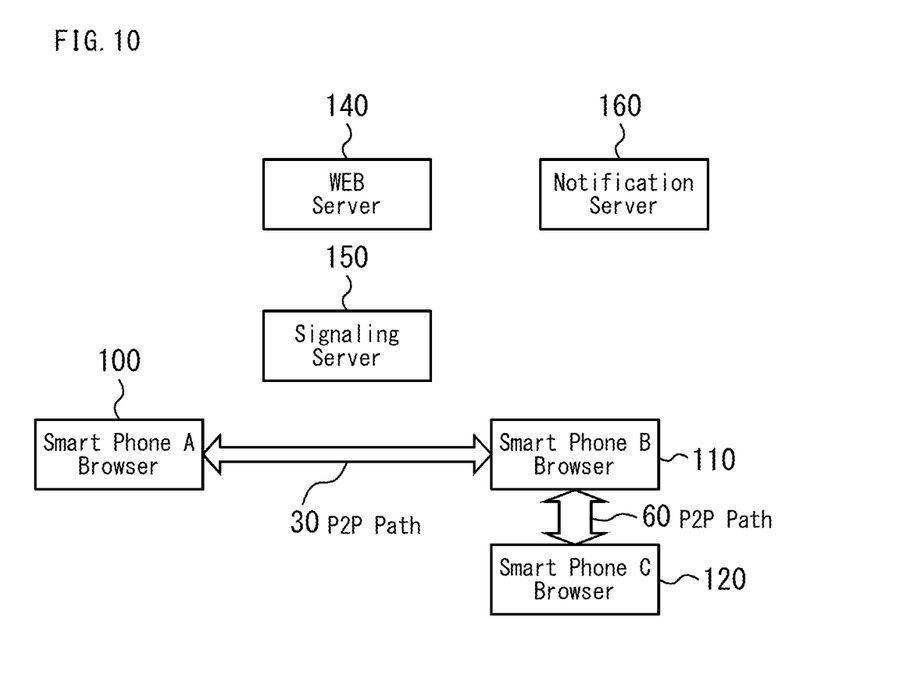
FIG. 10 is a diagram showing a state in which a P2P path is opened not only between the caller(A)nd the callee(B)ut also between the callee and the take-over person in the WEB telephone system according to the first embodiment of the present disclosure.

FIG. 10 shows a state after the above-described information exchange is completed. As shown in FIG. 10, the smartphones 110 and 120 establish a P2P path that enables communication therebetween based on each other's SDP (60). As a result, the smartphone 110 of the callee(B) simultaneously has both the P2P path 30 connected to the smartphone 100 of the caller(A) and the P2P path 60 connected to the smartphone 120 of the take-over person(C).

Figure 11:
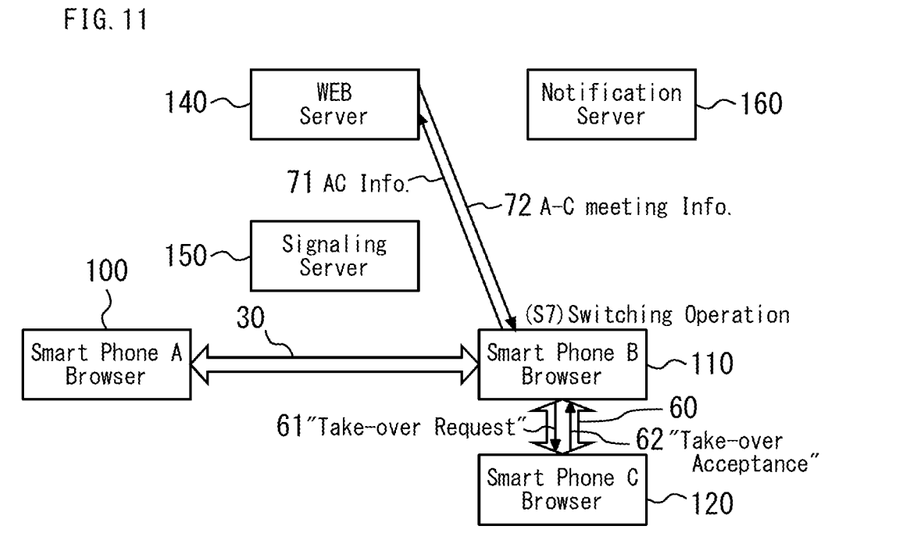
FIG. 11 is a diagram for explaining a flow of processing from when the callee issues a takeover request to when information necessary for waiting between the caller(A)nd the take-over person is provided to the callee in the WEB telephone system according to the first embodiment of the present disclosure.

FIG. 11 shows a state after the callee(B) transmits a takeover request such as a statement of "Call from person A" to the take-over person(C) by voice via the P2P path 60 (61), and the take-over person(C) responds with an intention of acceptance of takeover such as "Take over" (62). In this case, the callee(B) performs an operation of switching the communication partner of the caller(A) from the callee(B) to the person (C) on the smartphone 110 (S7). The callee(B) can talk with the person (A) again prior to the switching operation. Therefore, the callee(B) may perform the switching operation after informing the person (A) that the communication partner is to be switched to the person (C).

When the switching operation is performed, the smartphone 110 provides information on the smartphone 100 of the person (A) and information on the smartphone 120 of the person (C) (hereinafter referred to as "AC information") to the WEB server 140 (71).

Upon receiving the AC information, the WEB server 140 returns an A-C meeting information to the transmission source, i.e., to the smartphone 110 (72). That is, when the WEB server 140 receives from a specific smartphone (here, the smartphone 110) information of two other smartphones which are different from the specific smartphone (here, AC information), the WEB server 101 returns information necessary for the two other smartphones meeting to the specific smartphone that is the transmission source of the information.

Figure 12:
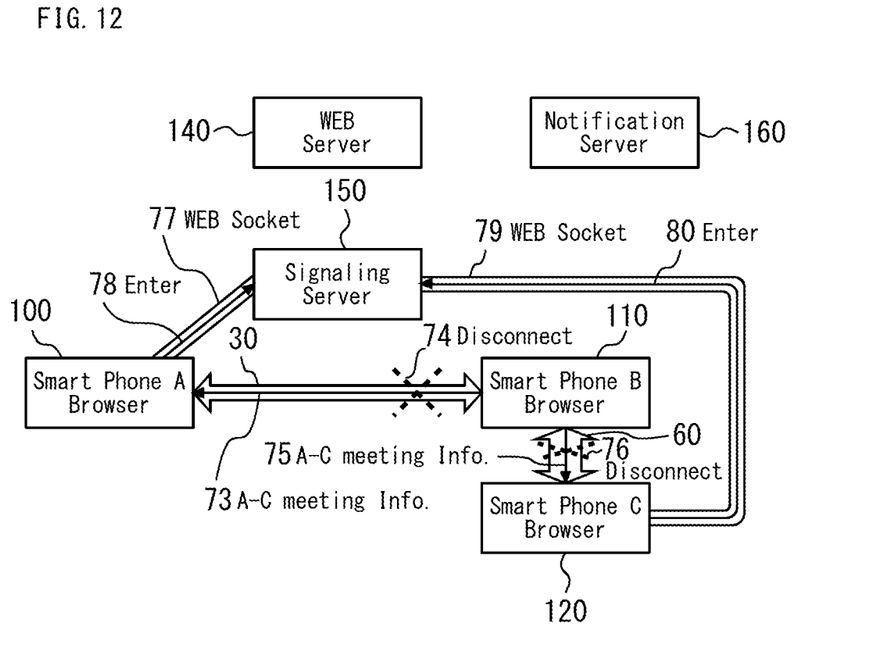
FIG. 12 is a diagram for explaining a flow of processing from when the information necessary for waiting between the caller(A)nd the take-over person is provided to the callee to when the waiting between the caller(A)nd the take-over person is completed in the WEB telephone system according to the first embodiment of the present disclosure.

FIG. 12 is a diagram for explaining the operation of the smartphone 110 that has received the A-C meeting information. At this stage, the two P2P paths 30 and 60 has been open to the smartphone 110. Therefore, the smartphone 110 can extremely easily transfer the A-C meeting information to both the smartphones 100 and 120 via the P2P paths 30 and 60.

To be specific, the smartphone 110 transmits the A-C meeting information received from the WEB server 140 to the smartphone 100 of the caller(A) via the P2P path 30 (73), and then disconnects the P2P path 30 (74). In addition, the smartphone 110 transfers the A-C meeting information to the smartphone 120 of the take-over person(C) via the P2P path 60 (75), and then disconnects the P2P path 60 (76).

According to such a handover procedure, the WEB server 140 does not need to newly establish a connection for providing the A-C meeting information neither between it and the smartphone 100 of the caller(A) nor between it and the smartphone 120 of the take-over person(C). Therefore, according to the WEB telephone system of the present embodiment, the hand-over of an IP telephone call can be smoothly proceeded in an extremely short time.

Upon receiving the A-C meeting information, the smartphone 100 of the caller(A) opens a WEB socket to the signaling server 150 (77) and enters the meeting area (78). Similarly, upon receiving the A-C meeting information, the smartphone 120 of the take-over person(C) also opens a WEB socket to the signaling server 150 (79) and enters the meeting area (80).

Figure 13:
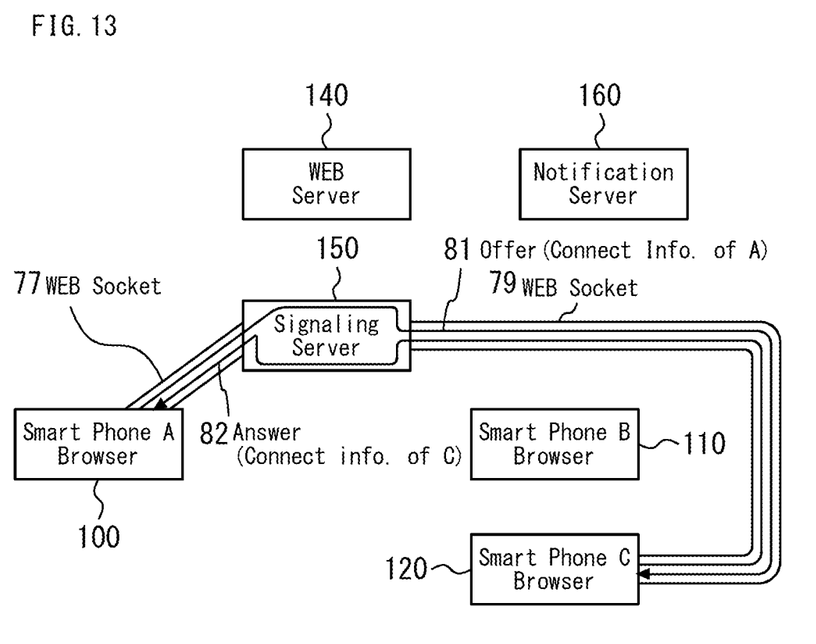
FIG. 13 is a diagram showing a state in which the caller(A) and the take-over person exchange mutual connection information in the WEB telephone system according to the first embodiment of the present disclosure.

FIG. 13 illustrates a state in which the smartphone 100 of the caller(A) and the smartphone 120 of the take-over person(C) exchange information with each other in the meeting area. Here, it is assumed that the smartphone 120 of the take-over person(C) enters the meeting area first, and then the smartphone 100 of the caller(A) enters the meeting area with a delay. In this case, the signaling server 150 notifies the smartphone 100 that the smartphone 120 has already entered the area. Then, the smartphone 100 having received the notification issues an offer to the smartphone 120 of the take-over person(C) (81).

The smartphone 120 that has received the offer returns an answer to the smartphone 100 (82). Each of the offer and the answer includes an SDP including communication information of a transmission source. Therefore, by the above processing, information necessary for communication with the other party is mutually exchanged between the smartphones 100 and 120.

Figure 14:
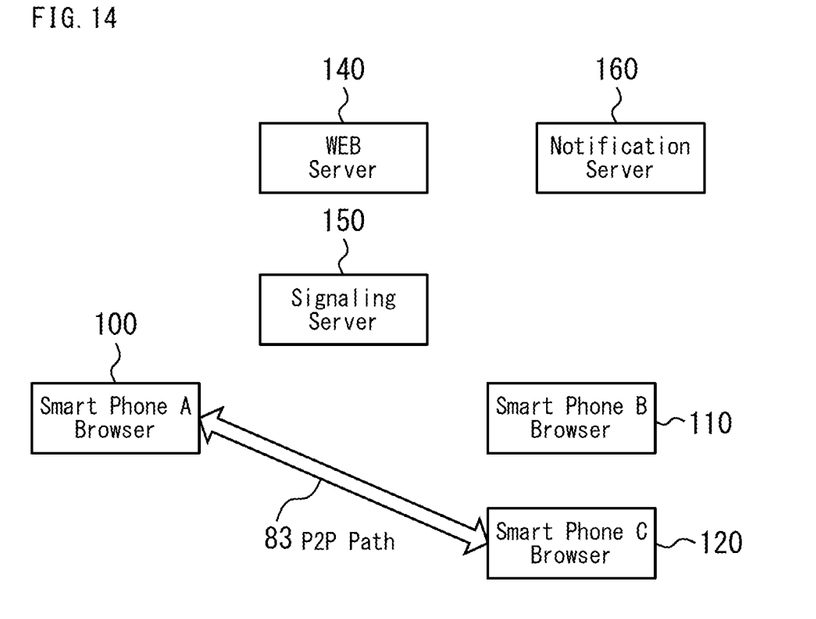
FIG. 14 is a diagram showing a state in which a P2P path is opened between the caller(A)nd the take-over person in the WEB telephone system according to the first embodiment of the present disclosure.

FIG. 14 illustrates a state in which a P2P path (83) is established between the smartphone 100 of the caller(A) and the smartphone 120 of the take-over person(C) following the information exchange described above. Thereafter, both parties can communicate with each other by voice via the P2P path 83.

As described above, according to the WEB telephone system of the present embodiment, the caller(A) can make a call to a specific person by an IP phone without installing a special IP phone application in his/her smartphone 100. Consequently, the user of the IP telephone application can wait for the incoming call by the IP telephone without requesting the counter part person to install a special IP telephone application by let the caller to know the URL of the user.

Further, among users of the IP telephone application, an incoming IP telephone call can be smoothly handed over to others in an extremely short time. In business situations, telephone hand-over or take-over is frequently required. According to the WEB telephone system of the present embodiment, the function to achieve the above requirement can be realized at extremely low cost. For this reason, this system can be very effectively used as a business telephone by systematic introduction.

In the WEB telephone system according to the present embodiment, the WEB server 140 performs processing for calling the smartphone 110 of the callee(B) based on the terminal-specific identifier associated with the URL(B). Therefore, even if the SIM of the smartphone 100 is replaced, or even if a valid SIM is not inserted, the IP telephone call is reliably performed. In this respect, the WEB telephone system according to the present embodiment can provide the user with extremely high convenience when replacing the model or using the system abroad.

Modification of First Embodiment

In the first embodiment described above, the caller(A) scans the two-dimensional barcode to read the URL of the callee. However, it is not essential to use a two-dimensional barcode, and the URL of the callee may be entered directly into the browser. Further, the URL of the callee may be registered in the browser, and the callee may be called using the registered data.

In the first embodiment described above, the caller(A) calls the URL(B) specifying the personal ID of the callee(B) using an IP telephone, but the present disclosure is not limited to this. For example, the URL for specifying the call destination may be a group ID instead of a personal ID. Then, the called IP telephone may cause the terminals of the plurality of called persons belonging to the group to ring so that any of the plurality of called persons can respond to the IP telephone. According to such an aspect, the WEB telephone system of the present disclosure can be effectively used as a representative telephone of a company, a department representative telephone assigned to each department, a store representative telephone assigned to each store, or the like.

DESCRIPTION OF REFERENCE NUMERALS

100 Smartphone of caller(A)
110 Smartphone of callee(B)
120 Smartphone of take-over person(C)
130 Card
140 WEB server
150 Signaling server
160 notification server

The invention claimed is:

1. A WEB telephone system comprising:
a calling terminal (A) that makes an IP telephone call;
a called terminal (B) that receives the IP telephone call from the calling terminal (A);
a take-over terminal (C) that takes over a call from the calling terminal (A) from the called terminal (B);
a WEB server and a signaling server capable of communicating with the calling terminal (A), the called terminal (B), and the take-over terminal (C) via a network; and
a notification server configured to transmit a call signal to a terminal designated by a call request from the WEB server, wherein
said WEB telephone system is configured to execute:
establishing a first P2P path between the calling terminal (A) and the called terminal (B) in response to a call from the calling terminal (A) to the called terminal (B); and
establishing a second P2P path between the called terminal (B) and the take-over terminal (C) while maintaining the first P2P path in response to a calling operation performed on the called terminal (B) to the take-over terminal (C) during the first P2P path is established,
said called terminal (B) is configured to execute:
accepting a switching operation for transferring the IP telephone call from the calling terminal (A) to the take-over terminal (C) in a state in which the first P2P path and the second P2P path are established; and
transmitting AC information including identification information of each of the calling terminal (A) and the take-over terminal (C) to the WEB server in response to the switching operation,
said WEB server is configured to execute transmitting A-C meeting information to the called terminal B when receiving the AC information from the called terminal (B), said AC information being information of other two terminals different from the called terminal (B), and said A-C meeting information indicating a meeting area for the other two terminals to meet in the signaling server, said called terminal (B) is configured to further execute:
disconnecting the first P2P path after transmitting the A-C meeting information to the calling terminal (A) via the first P2P path; and
disconnecting the second P2P path after transmitting the A-C meeting information to the take-over terminal (C) via the second P2P path, said calling terminal (A) and said take-over terminal (C) are configured, respectively, to execute:
exchanging information of an SDP required for establishing a P2P path between both via the meeting area indicated by the A-C meeting information; and
transmitting and receiving voice signals to and from each other via a third P2P path established based on the SDP.

2. The WEB telephone system according to claim 1, wherein:
in order to establish the first P2P path,
said calling terminal (A) is configured to execute:
accepting an input of a URL (B) for making an IP telephone call to the called terminal (B); and
transmitting an A-to-B call including information of the URL (B) to the WEB server upon receiving the input of the URL (B),
said WEB server is configured to execute:
reading IP telephone registration information of the called terminal (B) registered in advance based on the URL (B) upon receiving the A-to-B call; and
transmitting a call request for calling the called terminal (B) to the notification server while identifying the terminal-specific identifier and the IP telephone application included in the IP telephone registration information,
said called terminal (B) is configured to execute:
receiving a call signal specifying the IP telephone application from the notification server;
activating the IP telephone application and generating an incoming call display upon receiving the call signal;
accepting an operation of call acceptance with respect to the incoming call display; and
transmitting a call acceptance notification to the WEB server in response to the call acceptance operation,
said WEB server is configured to further execute transmitting the A-B meeting information to both the calling terminal (A) and the called terminal (B) upon receiving the acceptance notification from the called terminal B, said A-B meeting information indicating a meeting area for the two terminals to meet in the signaling server,
said calling terminal (A) and the called terminal (B) are configured, respectively, to execute:
exchanging information of an SDP required for establishing the first P2P path between the both via the meeting area indicated by the A-B meeting information; and
establishing the first P2P path based on the SDP.

3. The WEB telephone system according to claim 2, wherein the process of accepting the input of the URL (B) includes a process of reading a two-dimensional barcode in which information of the URL (B) is embedded.

4. The WEB telephone system according to claim 2, wherein the process of exchanging information of the SDP includes:
a process in which one of the calling terminal (A) and the called terminal (B) that enters the meeting area later transmits an offer including its own SDP to the other one of the calling terminal (A) and the called terminal (B); and
a process in which one of the calling terminal (A) and the called terminal (B) that enters the meeting area first transmits an answer including its own SDP to the other in response to the offer.

5. The WEB telephone system according to claim 1, wherein:
in order to establish the second P2P path,
said called terminal (B) is configured to execute:
storing a URL (C) for making an IP telephone call to the take-over terminal (C);
accepting a calling operation to the take-over terminal (C) performed in the called terminal (B) during the the first P2P path is established; and
transmitting a B-to-C call including information of the URL (C) to the WEB server in response to the calling operation,
said WEB server is configured to execute:
reading IP telephone registration information of the take-over terminal (C) registered in advance based on the URL (C) upon receiving the B-to-C call; and
transmitting a call request for calling the take-over terminal C to the notification server while identifying the terminal-specific identifier and the IP telephone application included in the IP telephone registration information,
said take-over terminal (C) is configured to execute:
receiving the call signal specifying the IP telephone application from the notification server;
activating the IP telephone application and generating an incoming call display upon receiving the call signal;
accepting an operation of call acceptance with respect to the incoming call display; and
transmitting a call acceptance notification to the WEB server in response to the call acceptance operation,
said WEB server is configured to further execute transmitting B-C meeting information indicating a meeting area of both the called terminal (B) and the take-over terminal (C) in the signaling server to both the called terminal (B) and the take-over terminal (C) in response to the acceptance notification from the take-over terminal (C),
said called terminal (B) and the take-over terminal (C) are configured, respectively, to execute:
exchanging information of an SDP required for establishing the second P2P path between the both via the meeting area indicated by the B-C meeting information; and
establishing the second P2P path based on the SDP.

6. A WEB telephone server device configured to communicate with a calling terminal (A), a called terminal (B), and a take-over terminal (C) via a network, wherein
said WEB telephone server is configured to execute, when AC information, which is information of other two terminals different from the called terminal B, is received from the called terminal B, transmitting A-C meeting information, which indicates a meeting area for the other two terminals to meet in the signaling server, to the called terminal B, which is a transmission source of the AC information,
said AC information is information including identification information of each of the calling terminal (A) and the take-over terminal (C) corresponding to the other two terminals.

7. A non-transitory compute medium thereon instructions for causing a smartphone to function as a called terminal (B) that hands over an IP telephone call from a calling terminal (A) to a take-over terminal (C), wherein the instructions, when executed on a computer, perform a method comprising:

establishing a first P2P path between the calling terminal (A) and the called terminal (B) in response to a call from the calling terminal (A) to the called terminal (B);

establishing a second P2P path between the called terminal (B) and the take-over terminal (C) while maintaining the first P2P path in response to a calling operation performed on the called terminal (B) to the take-over terminal (C) during the first P2P path is established;

accepting a switching operation for transferring the IP telephone call from the calling terminal (A) to the take-over terminal (C) in a state in which the first P2P path and the second P2P path are established;

transmitting AC information including identification information of each of the calling terminal (A) and the take-over terminal (C) to a WEB server in response to the switching operation;

receiving A-C meeting information which the WEB server that has received the AC information returns to notify a meeting area where the calling terminal (A) and the take-over terminal (C) are to be met in the signaling server;

disconnecting the first P2P path after transmitting the A-C meeting information to the calling terminal (A) via the first P2P path; and disconnecting the second P2P path after transmitting the A-C meeting information to the take-over terminal (C) via the second P2P path.

8. A WEB telephone system connecting a calling terminal (A) which makes an IP telephone call, a called terminal (B) which receives the IP telephone call from the calling terminal (A), and a take-over terminal (C) which takes over the telephone call made by the calling terminal (A) from the called terminal (B) so as to enable voice communication, comprising:

a WEB server and a signaling server capable of communicating with the calling terminal (A), the called terminal (B), and the take-over terminal (C) via a network;

a notification server that provides a call signal to a terminal designated by a call request from the WEB server, wherein said WEB telephone system is configured to execute:

establishing a first P2P path between the calling terminal (A) and the called terminal (B) in response to a call from the calling terminal (A);

establishing a second P2P path between the called terminal (B) and the take-over terminal (C) while maintaining the first P2P path in response to a calling operation performed on the called terminal (B) to the take-over terminal (C) during the first P2P path is established; and transmitting AC information including identification information of each of the calling terminal (A) and the take-over terminal (C) to the WEB server from the called terminal (B) in response to a switching operation for handing over the IP telephone call made by the called terminal (A) to the take-over terminal (C) in a state where the first P2P path and the second P2P path are established, said WEB server is configured to execute transmitting A-C meeting information to the called terminal B when receiving the AC information from the called terminal (B), said AC information being information of other two terminals different from the called terminal (B), and said A-C meeting information indicating a meeting area for the other two terminals to meet in the signaling server, said WEB telephone system is configured to further execute:

receiving an instruction to disconnect the first P2P path from the called terminal (B) after the A-C meeting information is transmitted to the calling terminal (A) via the first P2P path;

disconnecting the second P2P path after the A-C meeting information is transmitted to the take-over terminal (C) via the second P2P path;

causing the calling terminal (A) and the take-over terminal (C) to exchange SDP information necessary for establishing a P2P path therebetween via the meeting area indicated by the A-C meeting information; and causing voice signals to be mutually transmitted and received via a third P2P path established based on the SDP.

9. The WEB telephone system according to claim 3, wherein the process of exchanging information of the SDP includes:

a process in which one of the calling terminal (A) and the called terminal (B) that enters the meeting area later transmits an offer including its own SDP to the other one of the calling terminal (A) and the called terminal (B); and a process in which one of the calling terminal (A) and the called terminal (B) that enters the meeting area first transmits an answer including its own SDP to the other in response to the offer.

* * * * *

UNITED STATES PATENT AND TRADEMARK OFFICE
CERTIFICATE OF CORRECTION

PATENT NO. : 12,432,303 B2
APPLICATION NO. : 18/034247
DATED : September 30, 2025
INVENTOR(S) : Seiichiro Shimohira and Yusuke Matsukawa Page 1 of 1

It is certified that error appears in the above-identified patent and that said Letters Patent is hereby corrected as shown below:

In the Claims

Column 15, Claim 7, Line 1 should read "A non-transitory computer readable medium having thereon instructions"

Signed and Sealed this
Eighteenth Day of November, 2025

John A. Squires
*Director of the United States Patent and Trademark Office*